(12) United States Patent
Schmidt (10) Patent No.: US 11,246,290 B1
(45) Date of Patent: Feb. 15, 2022

(54) WEARABLE APPARATUS AND METHOD FOR ANIMAL TRAINING

(71) Applicant: Capped Out Media, Taylorsville, UT (US)

(72) Inventor: Waynard Schmidt, Taylorsville, UT (US)

( * ) Notice: Subject to any disclaimer, the term of this patent is extended or adjusted under 35 U.S.C. 154(b) by 0 days.

(21) Appl. No.: 17/482,389

(22) Filed: Sep. 22, 2021

(51) Int. Cl.
  *A01K 15/02* (2006.01)
  *H02P 7/24* (2006.01)
  *H02J 7/02* (2016.01)

(52) U.S. Cl.
  CPC .......... *A01K 15/021* (2013.01); *A01K 15/026* (2013.01); *H02J 7/02* (2013.01); *H02P 7/24* (2013.01)

(58) Field of Classification Search
  CPC ....... A01K 15/021; A01K 15/026; H02J 7/02; H02P 7/24
  See application file for complete search history.

(56) References Cited

U.S. PATENT DOCUMENTS

| 4,180,013 A | * | 12/1979 | Smith | A01K 15/022 |
| | | | | 119/718 |
| 10,660,546 B2 | * | 5/2020 | Saigh | G16H 20/30 |
| 2017/0099808 A1 | * | 4/2017 | Garfinkel | A01K 27/003 |

FOREIGN PATENT DOCUMENTS

AT 407466 B * 3/2001 ............. A01K 27/00

* cited by examiner

*Primary Examiner* — Said Bouziane
(74) *Attorney, Agent, or Firm* — Bochner IP, PLLC; Andrew D. Bochner (57) ABSTRACT

A wearable animal training apparatus including a casing having an inner wall, and an outer wall. The apparatus includes a flexible first wire disposed against a proximal surface between the inner wall and the outer wall of the casing, and a flexible second wire disposed against a distal surface between the inner wall and the outer wall of the casing. The apparatus also includes a power source having a positive terminal and a negative terminal, and an electric motor. The first wire is connected to the positive terminal of the power source, and the second wire is connected to the negative terminal of the power source.

15 Claims, 6 Drawing Sheets

WEARABLE APPARATUS AND METHOD FOR ANIMAL TRAINING

FIELD OF INVENTION

The present invention is in the field of animal training apparatuses and methods, specifically apparatuses that are wearable by the user to assist them in training an animal.

INTRODUCTION

As part of growing up, most animals possessing teeth enter a phase of excessive biting or chewing, usually to alleviate pain associated with the growth of new teeth. This phase of biting and/or chewing poses significant problems to animal owners, who desire to prevent themselves from being bitten or chewed on. Often, the remedy to this problem is to simply wait until the animal grows out of this undesirable phase. Alternatively, the owner may give the animal chew toys to distract the animal from biting the owner. However, it is an inconvenience for animal owners to ensure that they are always within reaching distance of a chew toy whenever the animal begins biting or chewing on something undesirable.

Moreover, while chew toys may distract an animal from biting or chewing things, they do little to actively deter the animal from biting or chewing something undesirable (for example, one's fingers or hand). Often, these chew toys actually encourage the animal to bite and chew more.

Accordingly, it would be desirable to have a wearable device that is able to actively deter biting or chewing in a way that is harmless to the animal. It would further be desirable to have a wearable device that, via harmless negative reinforcement, teaches prolonged positive behavior to an animal.

SUMMARY

In an aspect of this disclosure, the device may be a wearable animal training apparatus which may include an annular casing having an inner wall, an outer wall, a circuit disposed inside a void defined by the inner wall, and at least one protrusion extending radially outward from the annular casing. The circuit may include a power source having a positive terminal, and a negative terminal. The circuit may also include a switch. The switch may have a first wire disposed against a proximal side of the inner wall of the annular casing, and a second wire disposed against a distal side of the inner wall of the annular casing. Wherein the first wire may be in electronic communication with the positive terminal of the power source, and the second wire may be in electronic communication with the negative terminal of the power source. The circuit may further include at least one electric motor operably connected to the switch. The at least one electric motor may have a first state and a second state. In the first state, the first wire and the second wire of the switch may be in contact with each other, causing the power source to supply power to the at least one electric motor, causing the electric motor to generate a vibration. In the second state, the first wire and the second wire of the switch may be operably separated, such that the motor does not generate a vibration. The at least one protrusion may have a cavity defined by an interior of each the at least one protrusion. The cavity may be fluidly connected to the void defined by the inner wall of the annular casing. The cavity may be sized to accommodate the at least one electric motor.

In an embodiment, the annular casing is constructed from at least one of silicone, rubber, polyethylene, thermoplastic, elastomers, synthetic polyisoprene, polyurethane, or nitrile.

In another embodiment, the outer wall defines an opening to facilitate charging of the power source.

In yet another embodiment, the wearable animal training apparatus may further include a wireless charging interface operably connected to the power source.

In another embodiment, the first and second wires are printed onto a flexible material. The flexible material may be polyimide film.

In an embodiment, the flexible material may be polyimide film.

In yet another embodiment, the wearable animal training apparatus further includes an inner ring disposed circumferentially along an approximate center between the proximal and distal sides of the inner wall of the annular casing. The inner ring may be constructed from a malleable material.

In another embodiment, the wearable animal training apparatus further includes a processor, a memory, and instructions. The instructions, when executed by the processor, may cause the processor to receive an electrical signal from the switch, generate a modulated electrical signal; and supply the modulated electrical signal to the at least one electric motor for a limited duration. The modulated electrical signal may be modulated in amplitude, or power.

In an embodiment, the wearable animal training apparatus further includes a neutral wire disposed between the first wire and the second wire, and an electric motor operably connected to one of the first or second wires, and the neutral wire.

In yet another embodiment, the circuit may include two electrical motors. In the first state, each electrical motor may produce vibrations at different frequencies.

In another embodiment, the wearable animal training apparatus further includes at least one loudspeaker electrically connected to the switch. In the first state, the loudspeaker may produce an audible sound, and in the second state, the loudspeaker may not produce the audible sound. The audible sound may be between 1,000 and 50,000 Hz.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

Figure 1A:
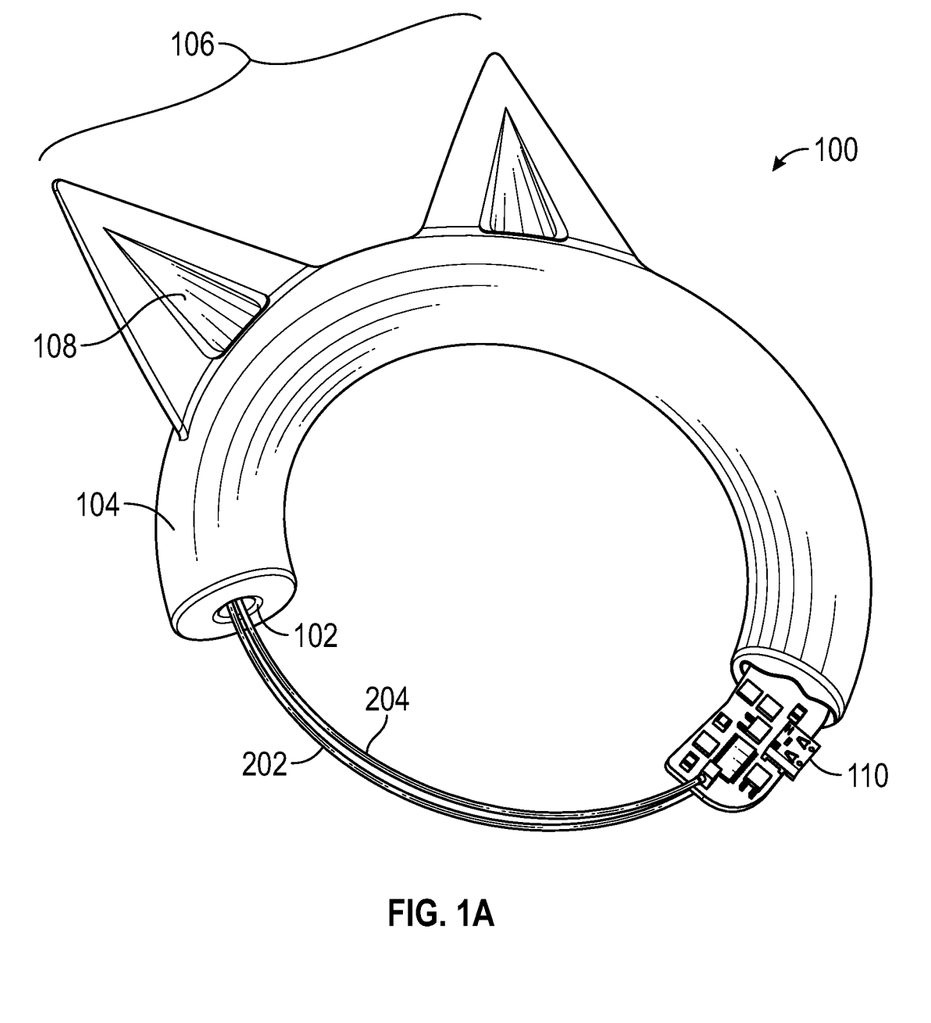
FIG. 1A shows a perspective view of the animal training apparatus.

Referring to FIG. 1A, in an embodiment the apparatus includes a casing 100. The casing 100 may include an inner wall 102 and an outer wall 104. The apparatus may be any suitable size to enable wearing by a user. In an embodiment where the casing 100 is annular, the apparatus may be sized to any of the standardized ring sizes (for example, Size 6=16.5 mm, Size 7=17.3 mm, Size 8=18.2 mm, etc.). The casing 100 may be constructed from at least one of silicone, rubber, or polyethylene. Other constructive materials may include thermoplastic, elastomers, synthetic polyisoprene, polyurethane, or nitrile. In an embodiment the material used to construct the casing 100 may be a variety of different colors. The material may have an anti-slip or grip-promoting texture (for example, configured to prevent an annular embodiment of the casing 100 from effortlessly being removed from the wearer's finger). The casing 100 may be manufactured from injection molding. Alternative manufacturing methods may include compression molding, liquid injection molding, extrusion, or transfer molding. In a further embodiment, the casing 100 may be manufactured via additive manufacturing (for example, 3D printing).

In an embodiment, the casing 100 includes a protective coating. The protective coating may consist of a non-toxic substance so as to not harm the animal biting or chewing the apparatus. The protective coating may be applied to the outer wall 104, for example, via a dip method, airbrush, or another spray method. In another embodiment, the protective coating may also be applied to the inner wall 102. Alternatively, the protective coating may be infused in at least the outer wall 104 (for example, during the manufacture process). The protective material of the casing 100 and the protective coating may be water resistant and/or waterproof. In an embodiment, the casing 100 is sealed such that liquid cannot enter the inside of the casing 100. In yet another embodiment, the casing 100 may include a ring inside a void defined by the inner wall 102 so as to provide structural support to the casing. In such an embodiment, the ring may be made out of malleable material to allow the user to shape the casing 100 to a shape of their preference.

The outer wall 104 may be curved. In an alternative embodiment, the outer wall 104 is flat. In one embodiment, the inner wall 102 and the outer wall 104 are continuous, such that both the inner and outer walls 102/104 share the same material. The casing 100 may be annular. As a non-limiting example, the casing 100 may be sized to accept a user's finger. In such an embodiment, the casing 100 defines an opening that may have a diameter between 15.7 mm and 22.2 mm. However, in another non-limiting example, the casing 100 may be sized to interface with any of a user's wrist, toe, hand, or other extremity. The casing 100 may be rigid, but may alternatively be flexible to allow a user to stretch the casing 100 so as to create a comfortable and snug fit on the user.

The casing 100 may have a circular cross-section. The cross-section may appear as concentric circles, for example, the inner wall 102 surrounded by the outer wall 104. In an embodiment, the casing 100 has relative uniformity, such that the casing 100 has a consistent circular cross-section at any point along the casing 100. In another embodiment, the casing 100 may be non-uniform. For example, the casing 100 may be circumferentially non-uniform, such that the casing 100 narrows and widens at one or more points. As a further example, the cross-section of the casing 100 may be oblong, square, triangular, or any other suitable shape.

In an embodiment, the casing 100 may also include at least one protrusion 106 to provide an animal with a greater surface area to bite on. The protrusion(s) 106 may extend up to 12.5 mm away from the outer wall 104 of the casing 100. As shown in FIG. 1A, the one or more protrusions 106 may be shaped to be visually appealing or to create a shape such as to resemble animal ears. The protrusion(s) 106 may include one or more recesses 108 disposed on one or more sides of the protrusion(s) 106. The recess 108 may be sized to accept the tooth or teeth of a dog or other animal. Alternatively, the protrusion(s) 106 may include one or more voids, such that the protrusion 106 forms a perimeter around the void. In such an alternate embodiment, the void may enable a dog's top teeth to interface with the dog's bottom teeth, such that the vibrational motion of the casing 100 causes the dog's top teeth to clatter against the dog's bottom teeth. In various embodiments, the one or more protrusions 106 may include any number and/or combination of recesses 108 and/or voids. In an embodiment, the recess 108 may begin at the outer wall 104 and extend towards the tip of the protrusion 106, with the recess 108 ceasing some distance before reaching the tip.

In one embodiment, the casing 100 may define an opening (not shown) to accommodate a charging port 110. In an alternative embodiment, the casing 100 may include a wireless charging interface (not shown) instead of an opening (not shown) to accommodate a charging port 110. Further, the opening (not shown) may include a removably attached stopper (not shown). The stopper (not shown) may be sized to traverse the opening (not shown). In an embodiment, the stopper (not shown) may create a seal, such that fluids may not enter the charging port 110 when the stopper (not shown) is inserted into the opening (not shown).

Figure 1B:
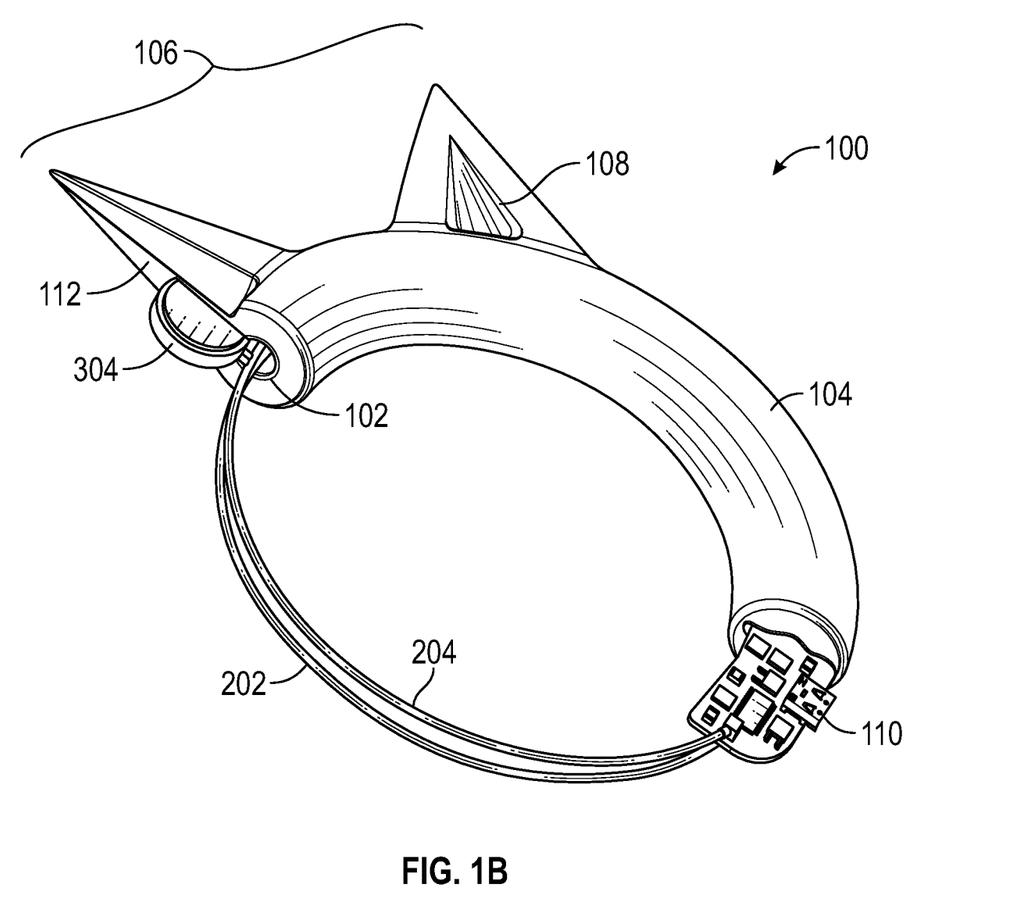
FIG. 1B shows a perspective view of the animal training apparatus.

An electric motor 304 may be placed inside an interior cavity 112 defined by at least one protrusion 106 as shown in FIG. 1B (the electric motor 304 is discussed in more detail below). In an embodiment, one electric motor 304 is placed in one protrusion 106. Alternatively, there may be more than one electric motor 304 placed inside a plethora of protrusions 106. In another embodiment, the one or more electric motors 304 may be disposed between the inner wall 102 and the outer wall 104.

Figure 2A:
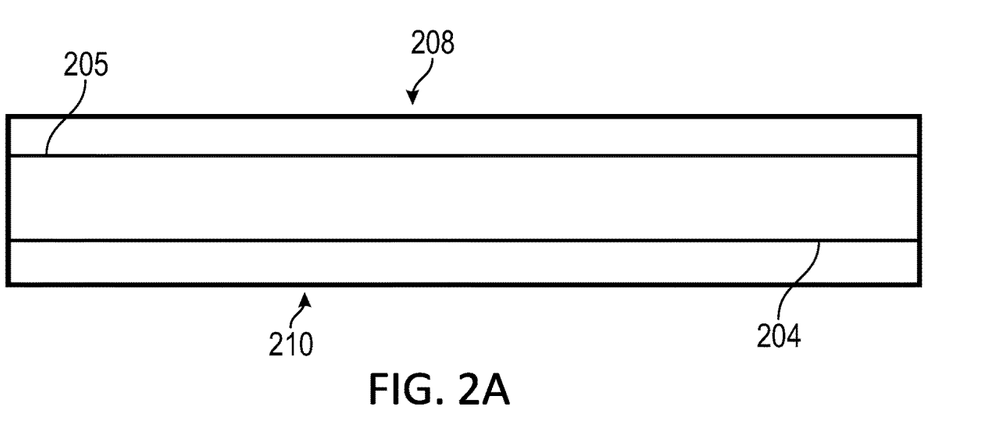
FIG. 2A shows a top cut away view of the animal training apparatus shown in FIG. 1.

Referring to FIG. 2A, the apparatus may contain a positive wire 202, and a negative wire 204. The wires 202/204 may be constructed from at least any of iron, steel, brass, bronze, copper, aluminum, zinc, gold, silver, or platinum. However, in various embodiments, the constructive material of the positive and negative wires 202/204 may be any suitably conductive material. In an embodiment, the positive and negative wires 202/204 are printed onto a flexible material, such as polyimide film. The positive wire 202, and the negative wire 204 may be positioned against the inner wall 102 at opposite sides inside the casing 100. In one embodiment, the positive and negative wires 202/204 extend though the entire length of the inside of the casing 100. The positive and negative wires 202/204 may also extend around a perimeter of the protrusion(s). The positive wire 202 may be disposed along a distal side 208 of the inner wall 102 of the casing 100, and the negative wire 204 may be disposed along a proximal side 210 of the inner wall 102 of the casing 100. In an alternative embodiment, the positive wire 202 is disposed along the proximal side 210 of the inner wall 102 of the casing 100, and the negative wire 204 is disposed along the distal side 208 of the inner wall 102 of the casing 100. In an embodiment, proximal may refer to the position closest to the hand of a user and distal may refer to the position closest to the tip of the finger of a user. In another embodiment, proximal may refer to the position closest to the skin of the user and distal may refer to the position furthest from the skin of the user.

In an embodiment, a distance 206 of at least 0.25 mm exists between the positive wire 202 and the negative wire 204, for example, to prevent erroneous contacts between the wires 202/204. However, in various embodiments, the distance 206 may be any suitable value. The positive and negative wires 202/204 may be flexible. In such an embodiment, the wires 202/204 may be printed onto a flexible material, such as polyimide film. In an embodiment, the positive and negative wires 202/204 may be rigid with a degree of flexibility to allow each wire to temporarily move toward an approximate center point of the distance 206 between the wires 202/204 when pressure is exerted onto the outer casing 100, before returning to their original displacement from each other when the pressure on the casing 100 is removed. In an embodiment in which the wires 202/204 are rigid, adequate rigidity and flexibility may be achieved by wrapping each wire 202/204 around a rigid structural member. In an alternative embodiment, the positive and negative wires 202/204 are adhered against opposing sides of the inner wall 102 to prevent the positive and negative wires 202/204 from becoming tangled, or erroneously making contact with each other. In an embodiment, the wires 202/204 are attached to the inner wall 102 via an adhesive or other means of fastening (for example, via stitching or staple). In another embodiment, the wires 202/204 may be partially embedded in the inner wall 102. As a non-limiting example, the inner wall 102 may include one or more wire slots (not shown) disposed along the inner wall 102. In a further non-limiting example, the one or more wire slots may be disposed along the inner wall 102 annularly, sized to partially accept the wires 202/204, retain the wires 202/204 under pressure, and configured to enable the wires 202/204 to touch when sufficient pressure is applied to the casing 100. In an alternate embodiment, the wires 202/204 may be shielded or partially shielded (for example, an insulating coating selectively disposed around the wires 202/204). For example, the wires 202/204 may include a short length of shielding along the portion of the wires 202/204 closest to the circuit 300.

Figure 2B:
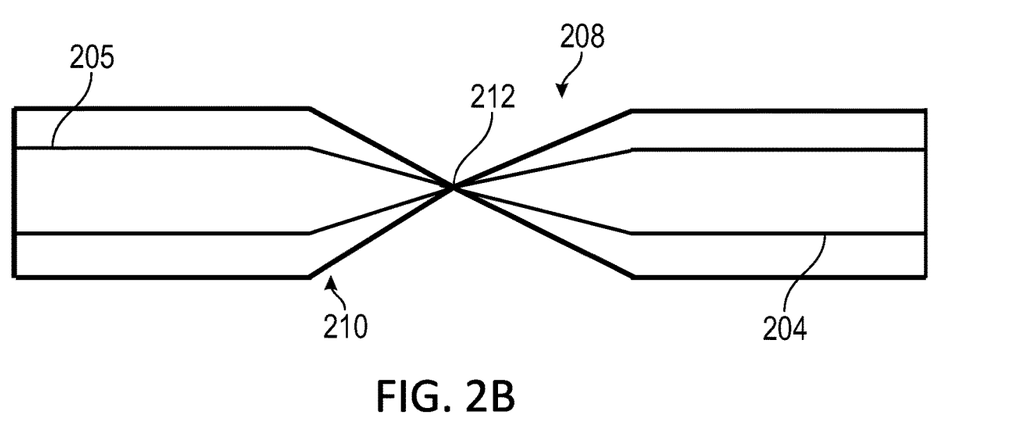
FIG. 2B shows a top cut away view of the animal training apparatus when pressure is applied.

As shown in FIG. 2B, in an embodiment, pressure may be applied to the casing 100 at a location 212. The location 212 may exist anywhere on the casing 100 where the positive and negative wires 202/204 are disposed within the casing 100. When adequate pressure is applied to the casing 100 at a location 212, the positive wire 202 may make contact with the negative wire 204 to complete a circuit 300 which may allow a power source 302 to power an electric motor 304, producing a vibration. In an alternative embodiment, the positive wire 202 may make contact with the negative wire 204 to complete a circuit 300 which may cause a processor to execute instructions. The circuit 300 and processor are discussed in more detail below. An adequate pressure required to complete the circuit may include a pressure of approximately 10 psi. However, in various embodiments, any suitable pressure may complete the circuit.

In a further embodiment, the apparatus includes a pressure sensor (not shown) disposed within the protrusion(s) 106. For example, the pressure sensor may be configured to, directly or indirectly, trigger the electric motor 304. In an embodiment, the electric motor 304 includes a pressure sensor. In an embodiment, wires 202/204 may extend into the protrusion 106. However, alternatively, a second set of wires (not shown) may be disposed within the protrusion(s) 106. The second set of wires may be in direct electrical communication with the circuit 300 and/or may be in electrical communication with the wires 202/204.

Figure 3:
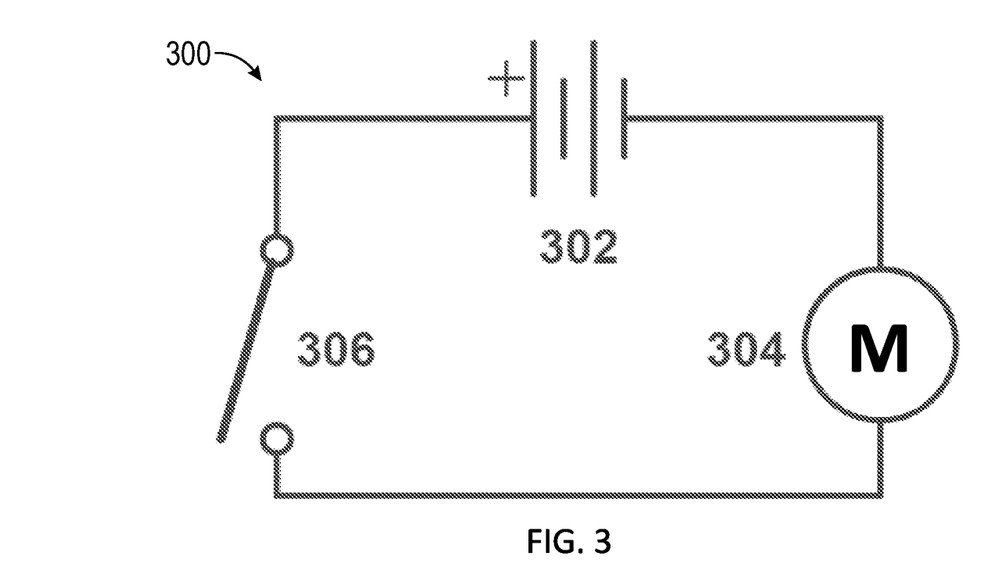
FIG. 3 shows a schematic circuit diagram of the circuit shown, in part, in FIGS. 1-2.

In an alternative embodiment, the circuit 300 also includes a neutral wire (not shown). The electric motor 304 may be connected to the neutral wire and one of either the positive wire 202 or negative wire 204. In an embodiment, when the pressure is exerted on the casing 100, the neutral wire makes contact with the wire not previously connected to the electric motor 304 which then completes the circuit allowing power delivery from the power source 302 to the electric motor 304. In a further alternate embodiment, the circuit 300 also includes an electrical ground.

Referring to FIG. 3, a circuit 300 may be located inside of the casing 100. In an embodiment, the circuit includes a power source 302, an electric motor 304, and a switch 306 arranged in series. The power source 302 may be a cell or a battery. As a non-limiting example, the battery may be a rechargeable, non-replaceable, lithium polymer battery. A storage capacity of the power source 302 may range from 15-22 mAh. However, in various embodiments, the storage capacity may be any suitable capacity. At full charge, the power source 302 may power the circuit 300 for a duration of 4-7 days. In an embodiment, the power source 302 is charged through a charging port 110 located in an opening (not shown) of the casing 100. In a different embodiment, the power source 302 may be charged through a wireless charging interface (not shown) located within the casing 100.

In an embodiment, the casing 100 includes one or more indentations along the inner wall 102. The one or more indentations may be sized to at least partially accept the circuit 300. For example, the one or more indentations may be slits in the inner wall 102 sized to accept the sides of the circuit 300. The one or more indentations may be configured to maintain the position of the circuit 300 and to prevent the circuit 300 from moving during use.

The electric motor 304 may be a linear resonant actuator (hereinafter "LRA"). Alternatively, the electric motor may be an eccentric rotating mass vibration motor (hereinafter "ERM"). Types of ERM motors may include coin vibration motors, surface mount vibration motors, or cylinder coreless motors. However, in various embodiments, the electric motor 304 may be any suitable class of motors. The circuit 300 may include more than one electric motor 304. In one embodiment, the circuit includes two electric motors. In a further embodiment, the two or more electric motors may produce vibrations at different frequencies. Frequencies produced by the motor(s) may be in the range of 1,000-11,000 RPM. The circuit 300 may include a combination of LRAs and ERMs.

In one embodiment, the switch 306 is closed by a user exerting pressure on a proximal side 210 and distal side 208 of the casing 100 as discussed above. In a different embodiment, the switch may be operated wirelessly. In a wirelessly operated embodiment, the user pushes a button on an external device which produces a signal. The signal may be transmitted as an ultra-high frequency radio wave. Alternatively, the signal may be transmitted as a low frequency radio wave. The signal may be received by a processor which completes the circuit for a limited period of time. In an embodiment, an external button switch may be connected to the circuit via a wire such that, when pressed, the processor completes the circuit for a limited period of time. The processor is discussed in more detail below.

The circuit 300 may also include a processor, and a memory containing instructions. In an embodiment, when the switch 306 is closed the completed circuit causes the processor to execute the instructions. The instructions, when executed by the processor, may cause the electric motor 304 to produce a configured vibration pattern. The vibration pattern may be modulated in intensity, and/or duration. In an embodiment, when the processor executes the instructions, the duration of the vibration may exceed for a limited duration past the point at which pressure is removed from the casing 100. As a non-limiting example, the vibrational pattern may begin at a relatively low intensity and increase as long as the circuit is complete. In another non-limiting example, the frequency may be increased as long as the circuit is complete. In yet another non-limiting example, the vibrational pattern may include a number of pauses. In such an example, the instructions may be configured to instruct the electric motor 304 to exert short bursts and/or long bursts of vibration in any combination and/or number. In an embodiment, the memory includes one or more vibrational patterns, stored as instructions. In such an embodiment, the processor may randomly select from the one or more vibrational patterns upon actuation. Further, the processor may include pre-determined instructions, for example, including a pre-determined sequence of vibrational patterns. In an embodiment, the memory may include instructions, which prevent the electric motor 304 from actuating (for example, to prevent the electric motor 304 from excessively vibrating and/or draining the battery). In such an embodiment, the instructions may include a pre-determined duration of time (for example, 3 minutes). As a non-limiting example, if the electric motor 304 is vibrating for more than 3 minutes, the processor may instruct the electric motor 304 to cease.

In another embodiment, the circuit 300 includes at least two electric motors. The instructions, when executed by the processor, may cause each electric motor to produce its own configured vibration pattern. This allows a user to configure a vibration pattern that their animal finds particularly unpleasant.

The circuit 300 may also include at least one loudspeaker. In an embodiment, when the switch 306 is closed the instructions, when executed by the processor, cause a frequency to be sent to the loudspeaker which produces a noise at that frequency. The frequency may be modulated in amplitude and/or frequency depending on the configuration. The frequency produced may be in a range outside the human range of hearing, but still within the frequency range that may be heard by animals. As a non-limiting example, the loudspeaker may emit frequencies in the range of 1,000 Hz to 50,000 Hz. The circuit 300 may include a combination of electric motors and loudspeakers. In one embodiment, the electric motor(s) and loudspeaker(s) may be configured to produce a combination of vibration(s) and noise(s) which are particularly effective at deterring the animal from biting and/or chewing on the apparatus.

Figure 4:
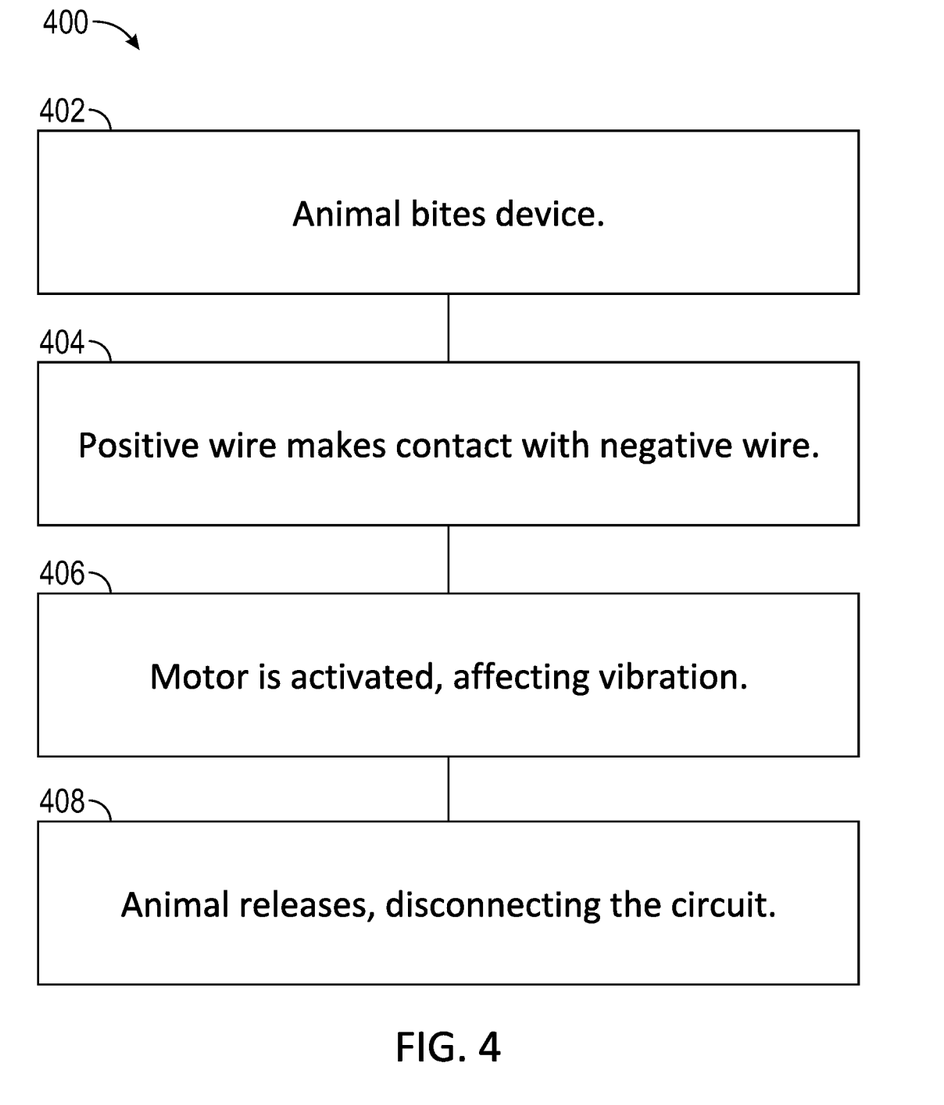
FIG. 4 shows a method for operating the animal training apparatus.
Figure 5:
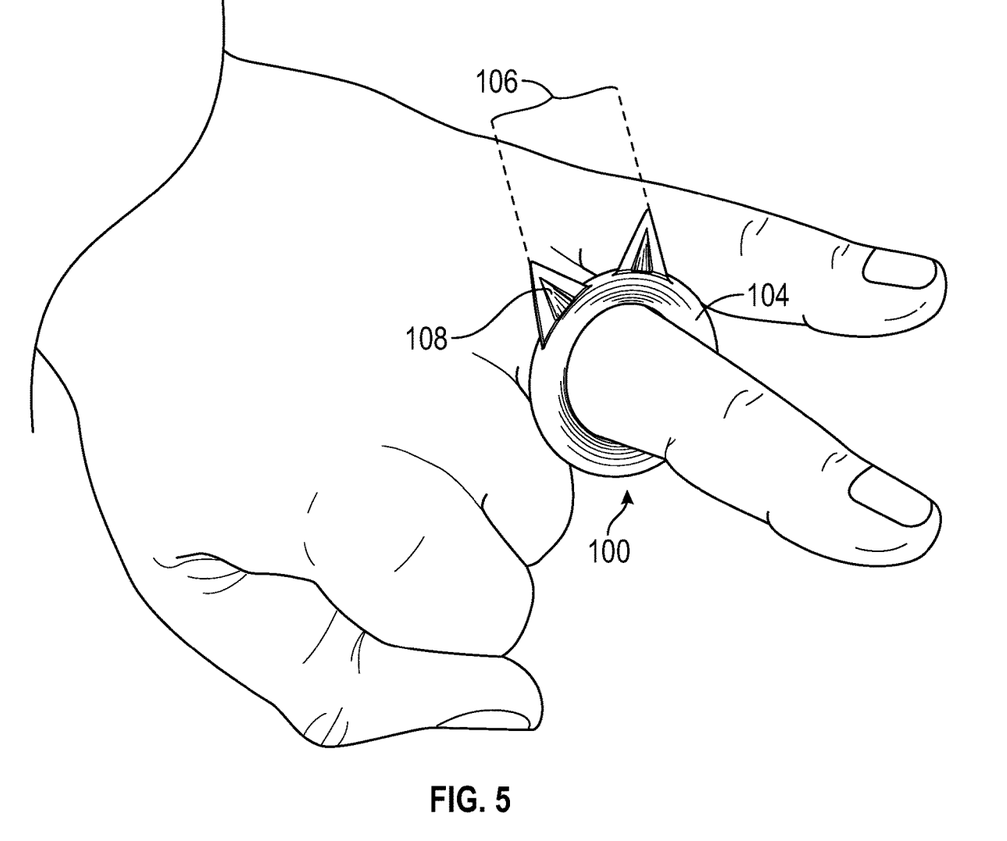
FIG. 5 shows a perspective view of the animal training apparatus as worn by a user.

FIG. 4 discloses a method 400 under which the animal training apparatus may operate. In the first step 402, an animal bites the casing 100 which applies pressure to the proximal side 210 and the distal side 208 of the casing 100. Alternatively, the wearer may apply pressure. As a non-limiting example, the wearer may press their thumb into the casing 100 to initiate vibration. In step 404, the pressure on the casing 100 created by the animal bite causes the positive wire 202 and negative wire 204 to move closer to each other, eventually making contact to complete the circuit 300 and allowing power to flow through the circuit. In step 406, the completed circuit 300 causes the power source 302 to deliver power to the electric motor 304, causing a vibration to occur. Finally, in step 408, the animal senses the vibration through their mouth, causing them to stop biting the apparatus. This terminates the compressing force on the casing 100 causing the positive and negative wires 202/204 to separate, breaking the circuit 300 which causes the electric motor 304 to stop.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:
1. A wearable animal training apparatus, comprising:
an annular casing including an inner wall, and an outer wall;
a circuit disposed inside a void defined by the inner wall, the circuit including:
   a power source having a positive terminal and a negative terminal;
   a switch including:
      a first wire disposed against a proximal side of the inner wall of the annular casing;
      a second wire disposed against a distal side of the inner wall of the annular casing;
         wherein the first wire is in electronic communication with the positive terminal of the power source, and the second wire is in electronic communication with the negative terminal of the power source;
   at least one electric motor operably connected to the switch;
      wherein the at least one electric motor has a first state and a second state;
         wherein the first state, the first wire and the second wire of the switch are in contact with each other, causing the power source to supply power to the at least one electric motor, causing the electric motor to generate a vibration;
         wherein the second state, the first wire and the second wire of the switch are operably separated, such that the motor does not generate a vibration; and
at least one protrusion, the at least one protrusion extending radially outward from the annular casing, each of the at least one protrusion including:
   a cavity defined by an interior of each the at least one protrusion, and fluidly connected to the void defined by the inner wall of the annular casing;
   wherein the cavity is sized to accommodate the at least one electric motor.

2. The wearable animal training apparatus of claim 1, wherein the annular casing is constructed from at least one of silicone, rubber, polyethylene, thermoplastic, elastomers, synthetic polyisoprene, polyurethane, or nitrile.

3. The wearable animal training apparatus of claim 1, wherein the outer wall defines an opening to facilitate charging of the power source.

4. The wearable animal training apparatus of claim 1, further including a wireless charging interface operably connected to the power source.

5. The wearable animal training apparatus of claim 1, wherein the first and second wires are printed onto a flexible material.

6. The wearable animal training apparatus of claim 5, wherein the flexible material is polyimide film.

7. The wearable animal training apparatus of claim 1, further including:
an inner ring disposed circumferentially along an approximate center between the proximal and distal sides of the inner wall of the annular casing.

8. The wearable animal training apparatus of claim 7, wherein the inner ring is constructed from a malleable material.

9. The wearable animal training apparatus of claim 1, further including a processor, a memory, and instructions;
wherein the instructions, when executed by the processor, cause the processor to:
receive an electrical signal from the switch;
generate a modulated electrical signal; and
supply the modulated electrical signal to the at least one electric motor for a limited duration.

10. The wearable animal training apparatus of claim 9, wherein the modulated electrical signal is modulated in amplitude, or power.

11. The wearable animal training apparatus of claim 1, further including:
a neutral wire disposed between the first wire and the second wire; and
an electric motor operably connected to one of the first wire, or the second wire, and the neutral wire.

12. The wearable animal training apparatus of claim 1, wherein the circuit includes two electrical motors.

13. The wearable animal training apparatus of claim 12, wherein, in the first state, each electrical motor produces a vibration at different frequencies.

14. The wearable animal training apparatus of claim 1, further including:
at least one loudspeaker electrically connected to the switch;
wherein, in the first state, the loudspeaker produces an audible sound; and
wherein, in the second state, the loudspeaker does not produce the audible sound.

15. The wearable animal training apparatus of claim 14, wherein the audible sound is between 1,000 and 50,000 Hz.

* * * * *